US012710329B2

(12) United States Patent
Pfau et al.

(10) Patent No.: US 12,710,329 B2
(45) Date of Patent: Aug. 18, 2026

(54) BALANCING MACHINE PROTECTIVE COVER, BALANCING MACHINE, AND METHOD FOR REFURBISHING A BALANCING MACHINE PROTECTIVE COVER

(71) Applicant: E. ZOLLER GmbH & Co. KG Einstell-und Messgeraete, Pleidelsheim (DE)

(72) Inventors: Christian Pfau, Ingersheim (DE); Alexander Zoller, Pleidelsheim (DE)

(73) Assignee: E. ZOLLER GmbH & Co. KG Einstell- und Messgeraete, Pleidelsheim (DE)

(*) Notice: Subject to any disclaimer, the term of this patent is extended or adjusted under 35 U.S.C. 154(b) by 295 days.

(21) Appl. No.: 18/714,471

(22) PCT Filed: Nov. 17, 2022

(86) PCT No.: PCT/EP2022/082208
§ 371 (c)(1),
(2) Date: May 29, 2024

(87) PCT Pub. No.: WO2023/099222
PCT Pub. Date: Jun. 8, 2023

(65) Prior Publication Data

US 2025/0027831 A1 Jan. 23, 2025

(30) Foreign Application Priority Data

Nov. 30, 2021 (DE) ..................... 10 2021 131 461.5

(51) Int. Cl.
*G01M 1/02* (2006.01)

(52) U.S. Cl.
CPC .................................... *G01M 1/02* (2013.01)

(58) Field of Classification Search
CPC ................................. G01M 1/02; G01M 1/16
See application file for complete search history.

(56) References Cited

U.S. PATENT DOCUMENTS

2019/0041289 A1 2/2019 Hof et al.

FOREIGN PATENT DOCUMENTS

DE 9107121 U1 10/1992
DE 202006002792 U1 4/2006
(Continued)

OTHER PUBLICATIONS

Search Report received in related German Application No. 10 2021 131 461.5, mailed Jun. 14, 2022, 11 pages.
(Continued)

*Primary Examiner* — Tarun Sinha
(74) *Attorney, Agent, or Firm* — Womble Bond Dickinson (US) LLP

(57) ABSTRACT

A balancing machine protective cover for an at least temporary closing of a balancing chamber of a balancing machine, comprises at least one first transparent element, at least one second transparent element and a frame unit, wherein the transparent elements are shaped and/or arranged in such a way that they can delimit the balancing chamber to at least one side, and wherein the two transparent elements are held by the frame unit in such a way that they together form a double-walled delimitation of the balancing chamber to the at least one side.

18 Claims, 4 Drawing Sheets

(56) References Cited

FOREIGN PATENT DOCUMENTS

Figure 1:
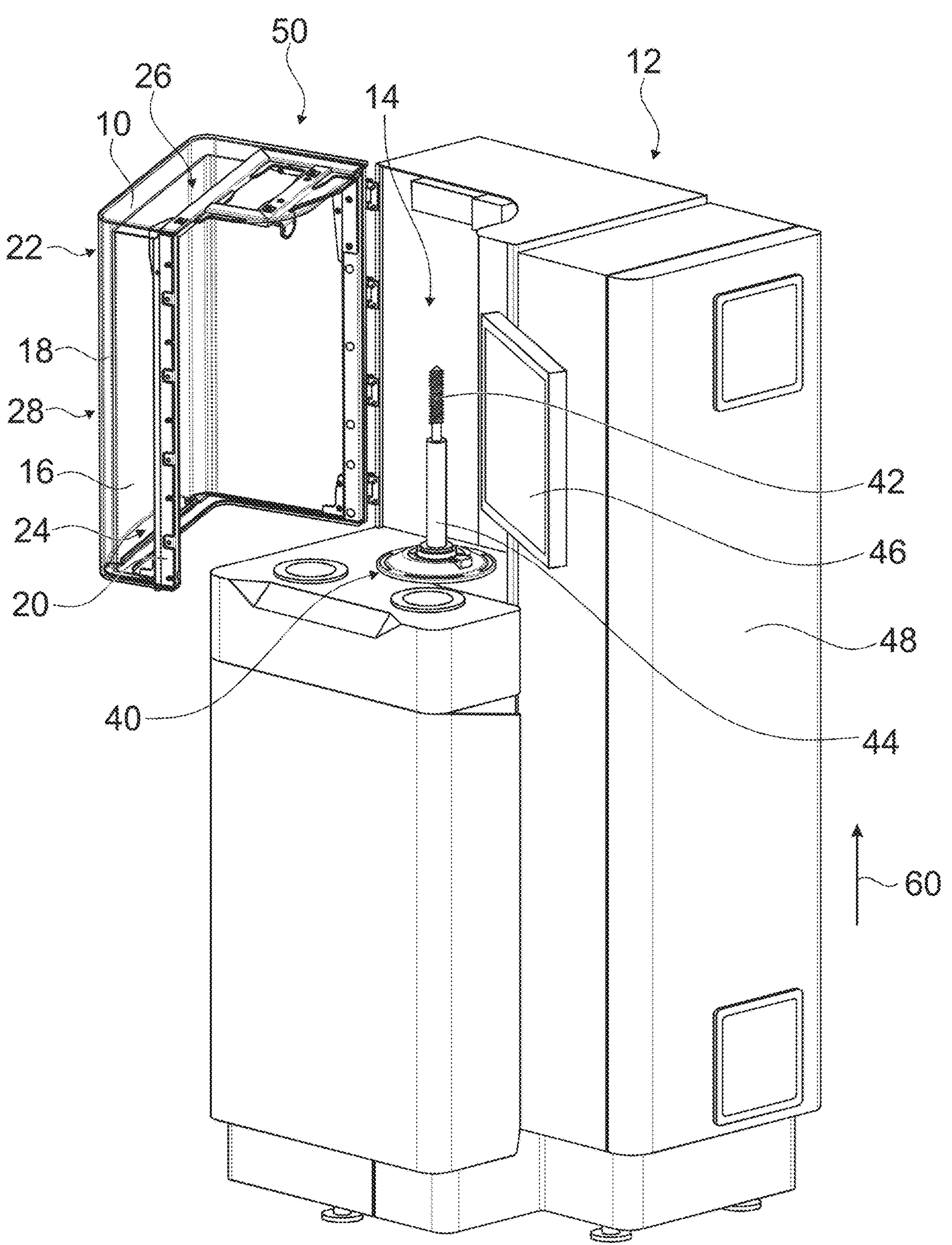

| | | | | |
|---|---|---|---|---|
| DE | 102012110146 | A1 | | 4/2014 |
| DE | 102019104097 | A1 | | 8/2020 |
| DE | 202021101052 | U1 | | 3/2021 |
| JP | 5889381 | B1 | * | 3/2016 |
| JP | 2016095286 | A | | 5/2016 |

OTHER PUBLICATIONS

International Search Report received in related International Application No. PCT/EP2022/082208, mailed Feb. 28, 2023, 16 pages.

International Preliminary Report on Patentability received in related International Application No. PCT/EP2022/082208, mailed May 2, 2024, 11 pages.

* cited by examiner

BALANCING MACHINE PROTECTIVE COVER, BALANCING MACHINE, AND METHOD FOR REFURBISHING A BALANCING MACHINE PROTECTIVE COVER

CROSS-REFERENCE TO RELATED APPLICATIONS

This patent application is a U.S. national stage application of international patent application PCT/EP2022/082208, filed on Nov. 17, 2022, which is based on and claims priority to German patent application DE 10 2021 131 461.5, filed on Nov. 30, 2021, the contents of which are incorporated herein by reference.

PRIOR ART

The invention relates to a balancing machine protective cover, a balancing machine, and a method for refurbishing a balancing machine protective cover.

It has already been proposed that working areas of balancing machines are protected by covers. However, these covers are subject to ageing and/or wear.

The objective of the invention is in particular to provide a generic device having advantageous covering properties. The objective is achieved according to the invention.

Advantages of the Invention

The invention is based on a balancing machine protective cover for an at least temporary closing of a balancing chamber of a balancing machine, with at least one first transparent element, with at least one second transparent element, and with a frame unit.

It is proposed that the transparent elements are shaped and/or arranged in such a way that they can delimit the balancing chamber to at least one side, preferably delimit the balancing chamber to at least one side, wherein the two transparent elements are held by the frame unit in such a way that they together form a double-walled delimitation of the balancing chamber to the at least one side. In this way, advantageous covering properties are achievable. Advantageously, a high level of safety is achievable, in particular against parts which can come loose during the rotation of a tool (at rotational speeds of up to 1200) required for a balancing of the tool, such as, for example, indexable inserts. Moreover, an outer design pane (the second transparent element), in particular its inner side, can advantageously be protected against damage or contamination.

Advantageously, a simple and cost-effective refurbishing is achievable, for example by replacement of the possibly more simply designed and/or more cost-effective first transparent element. Moreover, a wide selection range of materials/design forms of the outer design pane is advantageously achievable, in particular since the outer design pane does not necessarily have to meet defined safety requirements, such as break strengths, scratch resistances, oil resistances, cleaning agent resistances, etc. Advantageously, a high longevity of the balancing machine protective cover is achievable.

A "balancing machine protective cover" is in particular to mean an, in particular functional, component, in particular a structural and/or function component, of a balancing machine. A "balancing machine" is in particular to mean an, in particular electrical, device which is configured to determine a balancing quality of a tool and advantageously to perform and/or support a balancing process on the tool. In particular, the balancing machine forms a balancing chamber which is configured for receiving the tool to be balanced. In particular, the balancing machine is configured to carry out the balancing process on the tool that is arranged in the balancing chamber. In particular, the balancing chamber comprises at least one rotary receptacle for tools, which is configured for holding and rotating tools. In particular, the rotary receptacle is configured for rotating tools at high rotation speeds (>1,000 revolutions/minute). The first transparent element and/or the second transparent element are in particular in each case made of a plastic. The first transparent element and/or the second transparent element are preferably free of a filter effect for light and/or free of a coloring. Alternatively, however, an implementation with a coloring/filtering is also conceivable. In particular, the first transparent element and/or the second transparent element has a transparency for white visible light, in particular for daylight, of at least 70%, preferably at least 80%, preferentially at least 90%. In particular, the first transparent element and/or the second transparent element form a pane, preferably a viewing pane. In particular, respectively one pane plane of the panes faces towards the balancing chamber. In particular, the frame unit is at least largely made of sheet metal. In particular, the frame unit is realized as a sheet-metal mount/sheet-metal frame. In particular, the first transparent element and/or the second transparent element is fastened in the frame unit, for example by clamping-in, by screwing, by adhesive bonding or by a further known fastening method. In particular, the first transparent element and the second transparent element are arranged spaced apart from one another. In particular, the first transparent element and the second transparent element are arranged without contact to one another. Alternatively, however, contact points between the first transparent element and/or the second transparent element are also conceivable. In particular, the pane planes of the first transparent element and of the second transparent element are aligned at least substantially parallel to one another. In particular, an intermediate space between the two transparent elements is filled with a room air. In particular, the intermediate space between the two transparent elements is open towards an environment or at least not specially sealed off from the environment.

Furthermore, it is proposed that the transparent elements are shaped and/or arranged in such a way that they can delimit the balancing chamber to at least one further side, which is arranged at least substantially perpendicular to the side, preferably delimit the balancing chamber at least to the side and to the further side which is arranged at least substantially perpendicular to the side, wherein the two transparent elements are held by the frame unit in such a way that they together form a double-walled delimitation of the balancing chamber at least to the two different sides. In this way advantageous covering properties can be achieved. Advantageously, a particularly large protective cover, in particular delimiting a particularly large portion of the balancing chamber, with the afore-described advantageous properties, is achievable. The term "substantially perpendicular" is here in particular meant to define an orientation of a direction relative to a reference direction, wherein the direction and the reference direction, in particular when viewed in a projection plane, include an angle of 90° and the angle has a maximum deviation of in particular less than 8°, advantageously less than 5° and particularly advantageously less than 2°.

In addition, it is proposed that the transparent elements are shaped and/or arranged in such a way that they can delimit the balancing chamber to at least one second further side, which is arranged at least substantially perpendicular to the side and to the further side, preferably delimit the balancing chamber at least to the side, to the further side, which is arranged at least substantially perpendicular to the side, and to the second further side, which is arranged at least substantially perpendicular to the further side, wherein the two transparent elements are held by the frame unit in such a way that they together form a double-walled delimitation of the balancing chamber at least to the three different sides. This allows attaining advantageous covering properties. Advantageously, a particularly large protective cover, in particular delimiting a particularly large portion of the balancing chamber, with the afore-described advantageous properties can be obtained. Furthermore, the first transparent element and/or the second transparent element preferably has at least one third further side, which delimits the balancing chamber and which is in particular arranged at least substantially perpendicular to the further side and to the second further side. In particular, the third further side is arranged at least substantially parallel to the side. "Substantially parallel" is here in particular to mean an orientation of a direction relative to a reference direction, in particular in a plane, wherein the direction has a deviation from the reference direction that is in particular less than 8°, advantageously less than 5° and particularly advantageously less than 2°. Preferably, the first transparent element and/or the second transparent element delimits the balancing chamber of the balancing machine from a left-hand side, from a right-hand side, from above and from the front, in particular in a view from the front onto a properly installed balancing machine. In particular, the side forms a front side, in particular of the balancing machine protective cover, preferably of the balancing machine. In particular, the further side forms a left-hand side, in particular of the balancing machine protective cover, preferably of the balancing machine. In particular, the second further side forms a right-hand side, in particular of the balancing machine protective cover, preferably of the balancing machine. In particular, the third further side forms an upper side, in particular of the balancing machine protective cover, preferably of the balancing machine. Alternatively, it is also conceivable for the second further side not to be double-walled. In this case, for example, the first transparent element extends only in the region of the side (front side), the further side (right-hand side) and a further side (left-hand side) that is situated opposite the further side. The second further side (upper side) would then not be double-walled, which means that it would be single-walled.

Furthermore, it is proposed that the first transparent element is arranged so as to face towards the balancing chamber and is made of a material having a significantly higher break safety and/or shock strength than the second transparent element. In this way advantageous covering properties are achievable. Advantageously, a high degree of design freedom in combination with a high level of safety is achievable. The term "significantly higher" is in particular to mean higher at least by 30%, preferably at least by 45%, preferentially at least by 60% and particularly preferentially at least by 100%. In particular, the shock strength is determinable by measuring the impact strength according to Charpy. For example, the first transparent element can be provided with an impact strength according to Charpy of more than 80, while the second transparent element has an impact strength according to Charpy that is lower by at least 30%, for example of less than 40. An element being arranged so as to face towards the balancing chamber is in particular to mean that the element has a surface that directly constitutes the boundary of the balancing chamber.

Furthermore, it is proposed that the first transparent element is arranged so as to face towards the balancing chamber and forms a sacrificial pane. As a result, simple refurbishing of the balancing machine protective cover is advantageously enabled. Advantageously, costs are reducible and at the same time a high degree of design freedom is achievable. By a "sacrificial pane" a pane is to be understood that is easily exchangeable and/or in particular constitutes an exchangeable wear part. The fact that the first transparent element is arranged so as to face towards the balancing chamber is in particular to mean that the first transparent element directly delimits the balancing chamber.

If the sacrificial pane is mounted, in particular on the frame unit, in a non-destructively exchangeable manner, simple refurbishing of the balancing machine protective cover is advantageously enabled. Advantageously, a long service life is achievable. Advantageously, maintenance can be substantially simplified. In particular, the sacrificial pane is substantially more easily exchangeable than the second transparent element. In particular, the second transparent element is mounted in the frame unit so as to be detachable only with difficulty or so as to be non-detachable. As a result, a high level of safety and/or a particularly solid construction is advantageously achievable.

If herein the sacrificial pane is mounted on the frame unit via quick-exchangeable mounting elements, simple refurbishing of the balancing machine protective cover is advantageously enabled. The quick-exchangeable mounting elements may be realized as easily accessible screws or clips. Alternatively, it is conceivable that the sacrificial pane is mounted in the frame unit via a detachable latching connection of the frame unit. It is conceivable that in contrast the second transparent element is mounted in the frame unit in a fixed and/or at least substantially fluid-tight manner, for example glued in, joined or the like.

If the sacrificial pane is furthermore made of a polycarbonate, an advantageously high break strength/impact strength is achievable. Advantageously, a high level of safety against parts coming loose and being thrown out during the balancing process is achievable.

Beyond this, it is proposed that the second transparent element is arranged so as to face towards an outer side, in particular of the balancing machine, and is made of an acrylic glass. As a result, a high degree of design freedom and/or a long service life is advantageously achievable. An element being arranged so as to face towards the outer side is in particular to mean that the element has a surface that directly forms an outer shell of the balancing machine. In particular, the second transparent element does not form a direct boundary/forms only an indirect boundary of the balancing chamber. In particular, the second transparent element forms a portion of a design shell of the balancing machine. In particular, the second transparent element is more intensively colored on at least one of its sides than on at least one other of its sides. For example, the second transparent element is more intensively colored on a second further side (on the upper side) than on the further side (left-hand or right-hand side) and/or than on the side (front side). As a result, an optimum visibility into the balancing chamber can advantageously be ensured.

Alternatively, however, it is also possible that other portions of the second transparent element or of the first transparent element are colored.

In addition, it is proposed that the first transparent element and/or the second transparent element substantially projects in at least one spatial direction, preferably in the direction of the side (front side) of the balancing chamber/a front side of the balancing machine, beyond a space formed by a smallest possible imaginary geometric cuboid which just still completely encloses the frame unit. As a result, a particularly unobstructed view into the balancing chamber is advantageously enabled. This advantageously allows achieving high safety.

If the frame unit comprises at least one hinge, simple opening and closing of the balancing machine protective cover is advantageously achievable. In particular, the frame unit comprises at least two or more hinges. In particular, the frame unit is mounted on a housing of the balancing machine such that it is pivotable via the hinges. In particular, the frame unit is mounted such that it is pivotable around a pivot axis running in an installation direction of the balancing machine. Alternatively, however, pivotable support of the frame unit around a pivot axis running perpendicular to the installation direction is also conceivable. An “installation direction” is in particular to mean a spatial direction in which the balancing machine predominantly extends in a proper installation. In particular, the installation direction is realized as a vertical direction or is realized so as to run at least substantially parallel to the vertical direction. “Substantially parallel” is here in particular to mean an orientation of a direction relative to a reference direction, in particular in a plane, wherein the direction has a deviation from the reference direction of in particular less than 8°, advantageously less than 5° and particularly advantageously less than 2°.

It is also proposed that, in particular viewed at least in a projection onto a horizontal plane (in the installation direction), an imaginary plane intersecting with all vertical sides of the frame unit is substantially angled with respect to all pane planes formed by the transparent elements. As a result, a particularly unobstructed view into the balancing chamber is advantageously enabled. This allows attaining a high level of safety. The frame thus advantageously obstructs a view into the balancing chamber as little as possible. In particular, the frame unit is realized so as to be different from a flat square frame. In particular, the frame unit has at least one curved, bent and/or at least uneven frame side.

If the frame unit is formed of sheet metal, a high level of stability and a long service life are advantageously achievable.

Furthermore, it is proposed that the first transparent element and/or the second transparent element are/is realized so as to be free of symmetry axes. As a result, a particularly unobstructed view into the balancing chamber is advantageously enabled. As a result, a high level of safety is advantageously achievable. In addition, a particularly high degree of design freedom is advantageously achievable. In particular, all sides of the first transparent element have mutually different dimensions. In particular, all sides of the second transparent element have mutually different dimensions.

It is further proposed that a spacing of, in particular mutually facing, pane planes of the first transparent element and of the second transparent element is at least 0.3 cm, preferably at least 0.5 cm and preferentially at least 1 cm. As a result, a high level of safety is advantageously achievable. In addition, simple replacement is advantageously enabled.

In addition, it is proposed that at least the second transparent element forms a gripping recess. In this way, simple manual operation of the balancing machine protective cover is advantageously achievable. In particular, the gripping recess permits gripping into an intermediate space between the first transparent element and the second transparent element. In particular, the gripping recess is arranged on the side (front side) of the second transparent element. In particular, the gripping recess is arranged in a lower region/on a lower edge, as viewed in the installation direction, of the second transparent element.

Furthermore, a balancing machine with the balancing machine protective cover, and a method for refurbishing the balancing machine protective cover are proposed, in which a damaged and/or aged (first) transparent element that faces towards the balancing chamber is removed and is replaced by a new (first) transparent element that is at least substantially identical. As a result, a high level of safety and/or a long service life is advantageously achievable.

The balancing machine protective cover according to the invention, the balancing machine according to the invention and the method according to the invention shall not be limited here to the above-described application and implementation. In particular, in order to fulfil a functionality described here, the balancing machine protective cover according to the invention, the balancing machine according to the invention and the method according to the invention may have a number of individual elements, components, and units that differs from a number given here.

DRAWINGS

Further advantages will become apparent from the following description of the drawings. In the drawings an exemplary embodiment of the invention is illustrated. The drawings, the description, and the claims contain a plurality of features in combination. Someone skilled in the art will purposefully also consider the features individually and will find further expedient combinations.

Figure 2:
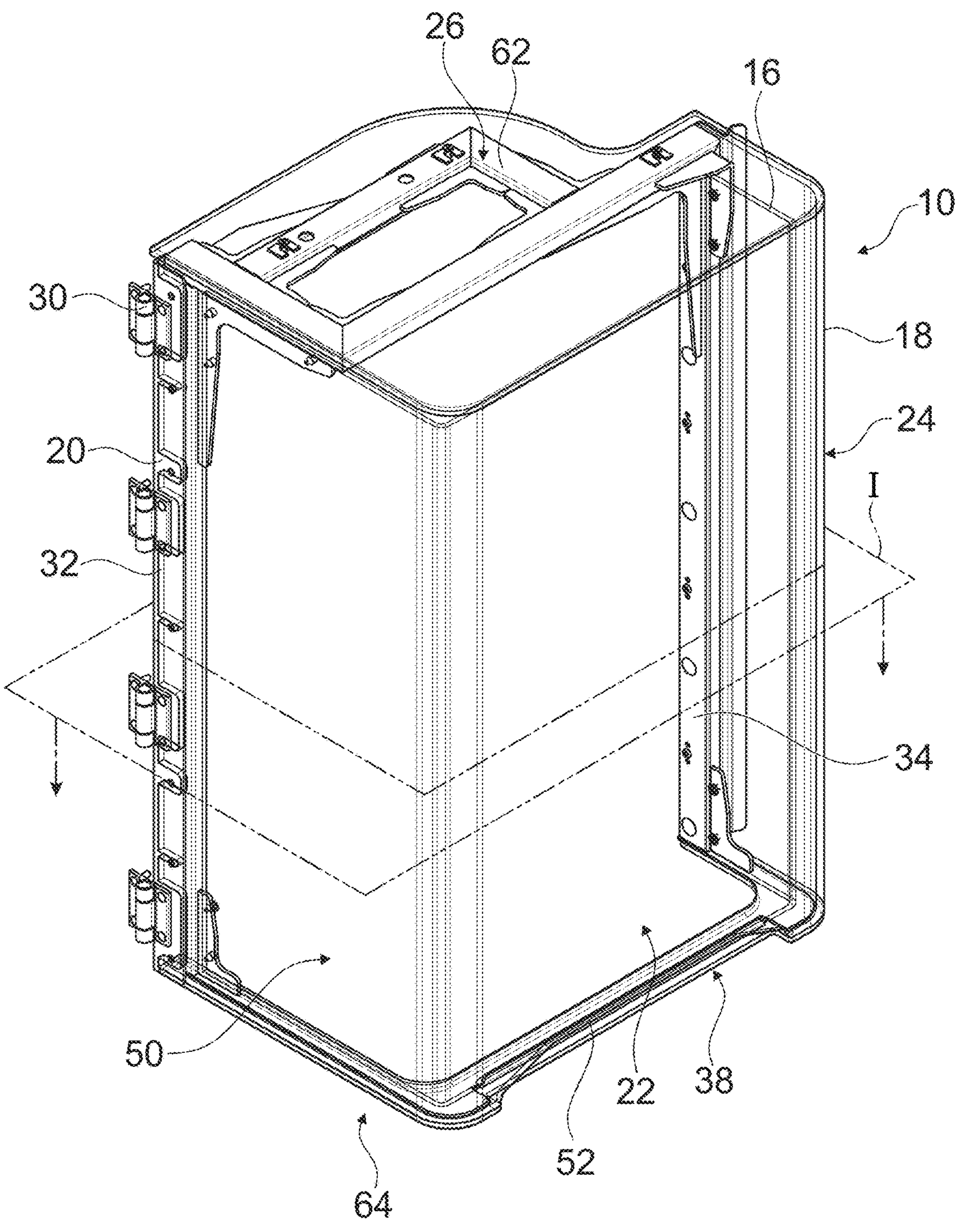
Figure 3:
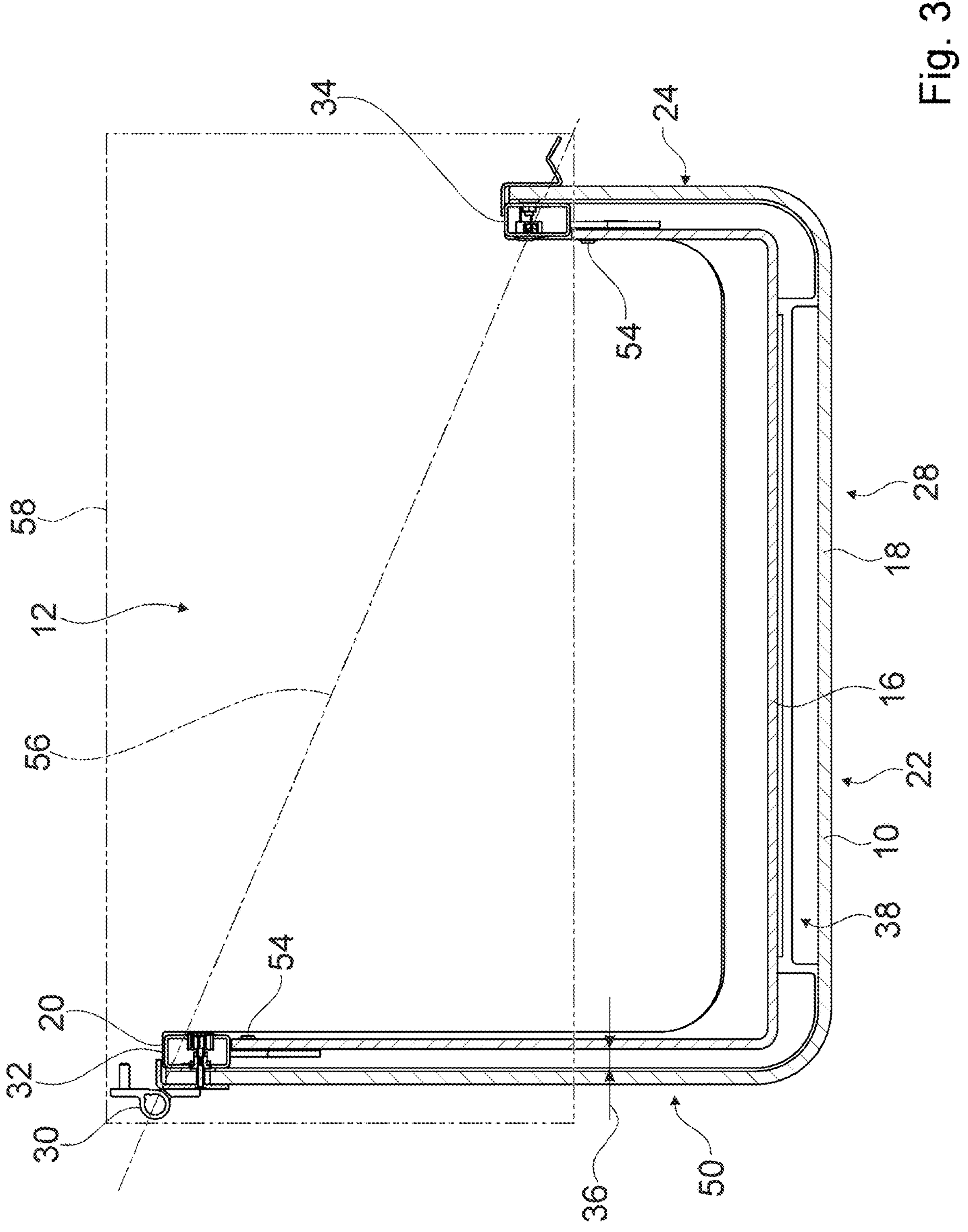
Figure 4:
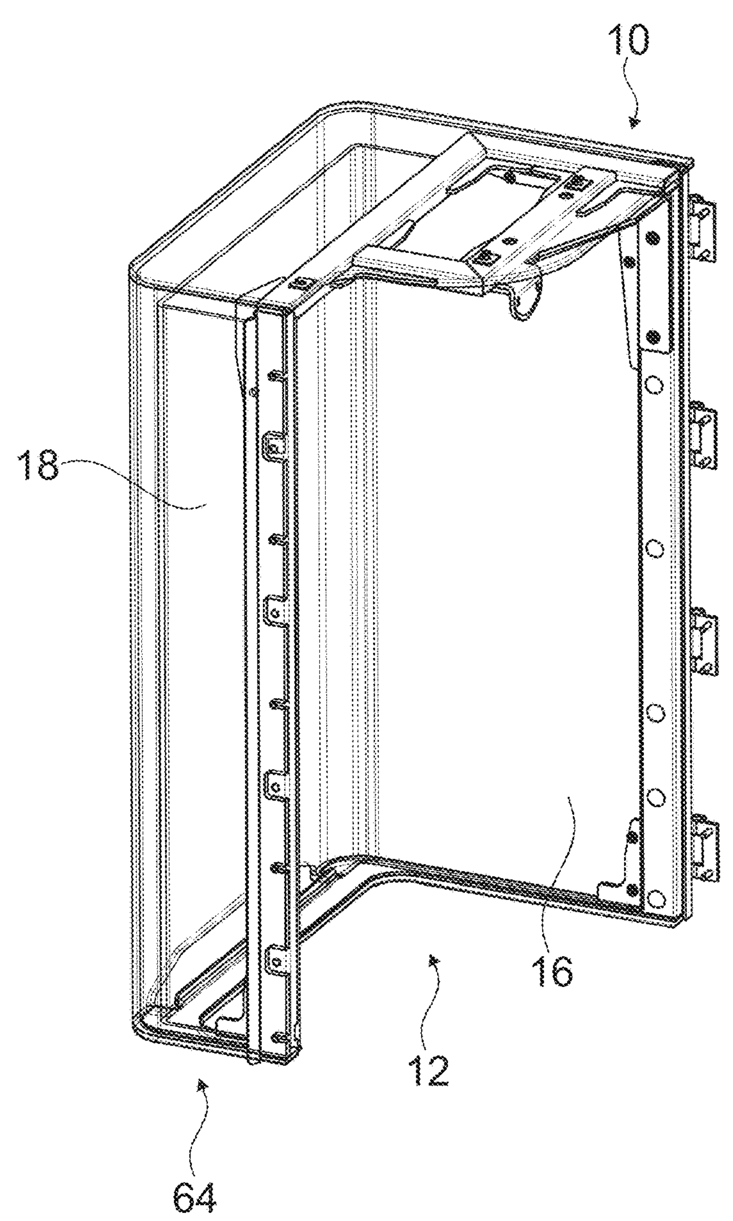
Figure 5:
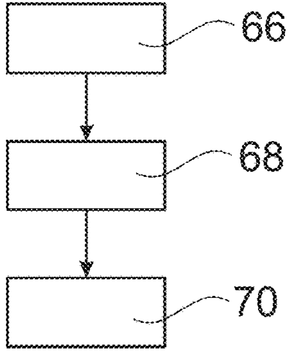

In the drawings:

FIG. 1 shows a schematic perspective illustration of a balancing machine with a balancing machine protective cover, FIG. 2 shows the balancing machine protective cover in a first schematic perspective view, FIG. 3 shows the balancing machine protective cover in a sectional view along the sectional plane I from FIG. 2, FIG. 4 shows the balancing machine protective cover in a second schematic perspective view, and FIG. 5 shows a flow chart of a method for refurbishing the balancing machine protective cover.

DESCRIPTION OF THE EXEMPLARY EMBODIMENT

FIG. 1 shows a schematic perspective illustration of a balancing machine 14. The balancing machine 14 forms a balancing chamber 12. The balancing machine 14 comprises a rotary receptacle 40 (rotary spindle unit) that is arranged in the balancing chamber 12. The balancing machine 14 is configured for a balancing of tools 42. The balancing machine 14 is configured for a balancing of tool holders 44 (tool chucks). The balancing machine 14 is configured for a balancing of tool units (tool holders 44 in which a tool 42 is fastened). The balancing machine 14 comprises an operating unit 46. The operating unit 46 is configured for an adjustment, controlling and/or monitoring of the operation of the balancing machine 14. The balancing machine 14 comprises a base body 48. The base body 48 carries the rotary receptacle 40. The base body 48 carries the operating unit 46. The base body 48 is illustrated as being installed in an installation direction 60.

The balancing machine 14 comprises a balancing machine protective cover 10. The base body 48 carries the balancing machine protective cover 10. The balancing machine protective cover 10 is configured for a temporary closing of the balancing chamber 12. The balancing machine protective cover 10 comprises a frame unit 20. The frame unit 20 is made of sheet metal. The frame unit 20 comprises hinges 30. The balancing machine protective cover 10 is articulated on the base body 48 such that it is movable and/or rotatable via the hinges 30.

FIG. 2 shows a schematic perspective illustration of the balancing machine protective cover 10. The balancing machine protective cover 10 comprises a first transparent element 16 (see also FIG. 3). The balancing machine protective cover 10 comprises a second transparent element 18 (see also FIG. 3). The transparent elements 16, 18 are shaped and arranged in such a way that they delimit the balancing chamber 12 to a side 22 that partially forms a front side of the balancing machine 14. The transparent elements 16, 18 are shaped and arranged in such a way that they delimit the balancing chamber 12 to a further side 24 that partially forms a right-hand side of the balancing machine 14. The side 22 and the further side 24 are arranged perpendicular to one another. The transparent elements 16, 18 are shaped and arranged in such a way that they delimit the balancing chamber 12 to an opposite-situated further side 50 that partially forms a left-hand side of the balancing machine 14. The side 22 and the opposite-situated further side 50 are arranged perpendicular to one another. The further side 24 and the opposite-situated further side 50 are arranged parallel to one another. The transparent elements 16, 18 are shaped and arranged in such a way that they delimit the balancing chamber 12 to a second further side 26 that partially forms an upper side of the balancing machine 14. The side 22, the further side 24 and the second further side 26 are arranged respectively perpendicular to one another. The side 22, the opposite-situated further side 50 and the second further side 26 are arranged respectively perpendicular to one another.

The two transparent elements 16, 18 are held by the frame unit 20 in such a way that they together form a double-walled delimitation of the balancing chamber 12 to the side 22 (front side). The two transparent elements 16, 18 are held by the frame unit 20 in such a way that they together form a double-walled delimitation of the balancing chamber 12 to the further side 24 (right-hand side). The two transparent elements 16, 18 are held by the frame unit 20 in such a way that they together form a double-walled delimitation of the balancing chamber 12 to the opposite-situated further side 50 (left-hand side). The two transparent elements 16, 18 may be held by the frame unit 20 in such a way that they could together form a double-walled delimitation of the balancing chamber 12 to the second further side 26 (upper side). In the case illustrated by way of example in the figures, however, the double-walled configuration extends only over the side 22, the further side 24 and the opposite-situated further side 50. The second further side 26 is free of the first transparent element 16. The first transparent element 16 extends over the side 22 (front side), the further side 24 (right-hand side) and the opposite-situated further side 50 (left-hand side). The first transparent element 16 is realized in one piece. The second transparent element 18 extends over the side 22 (front side), the further side 24 (right-hand side), the second further side 26 (upper side) and the opposite-situated further side 50 (left-hand side). Herein the second transparent element 18 may be realized in one piece or, as in the case illustrated in FIG. 2, may be divided into two parts, wherein one part delimits the second further side 26 (upper side) and the other parts delimit the remaining sides 22, 24, 50. The second transparent element 18 forms a gripping recess 38. The gripping recess 38 is arranged in the region of a lower edge 52 of the second transparent element 18. The first transparent element 16 is realized so as to be free of symmetry axes. The second transparent element 18 is realized so as to be free of symmetry axes. The first transparent element 16 projects in at least one spatial direction, in particular towards the front side of the balancing machine 14, beyond a space formed by a smallest possible imaginary geometric cuboid 58 which just still completely encloses the frame unit 20 (see also FIG. 3). The frame unit 20 at least comprises a curved, bent and/or uneven frame side 62. The curved, bent and/or uneven frame side 62 forms an upper side of the frame unit 20. The frame unit 20 has two vertical sides 32, 34, in particular lateral frame sides. The vertical sides 32, 34 are at least substantially straight. The frame unit 20 is realized free of a lower frame side. The frame unit 20 is not closed. The frame unit 20 is open downwards.

FIG. 3 shows a schematic horizontal section through the balancing machine protective cover 10. The first transparent element 16 is arranged so as to face towards the balancing chamber 12. The first transparent element 16 is made of a material having a significantly higher break resistance than the second transparent element 18. The first transparent element 16 is made of a material having a significantly higher shock strength than the second transparent element 18. The first transparent element 16 is made of a polycarbonate. The second transparent element 18 is arranged so as to face towards an outer side 28. The second transparent element 18 is made of an acrylic glass. The second transparent element 18 forms an outer design pane of the balancing machine 14. A spacing 36, in particular a minimum spacing, of pane planes of the first transparent element 16 and of the second transparent element 18 is at least 0.3 cm, preferably at least 0.5 cm and preferentially at least 1 cm.

The first transparent element 16 has a smaller thickness than the second transparent element 18. The first transparent element 16 has a thickness that is smaller by at least 20% than a thickness of the second transparent element 18. The first transparent element 16 forms a sacrificial pane. The first transparent element 16 and the second transparent element 18 are fastened to the common frame unit 20. The sacrificial pane is mounted on the frame unit 20 in a non-destructively exchangeable manner. The sacrificial pane is mounted on the frame unit 20 via quick-exchangeable mounting elements 54. An imaginary plane 56 intersecting with all vertical sides 32, 34 of the frame unit 20 is substantially angled with respect to all pane planes formed by the transparent elements 16, 18, in particular at least viewed in a projection onto a horizontal plane, as illustrated for example in FIG. 3.

FIG. 4 shows a schematic perspective illustration of the balancing machine protective cover 10 from a further perspective. On an underside 64 of the balancing machine protective cover 10, the second transparent element 18 projects slightly beyond the first transparent element 16 towards the balancing chamber 12.

FIG. 5 shows a schematic flow chart of a method for refurbishing the balancing machine protective cover 10. In at least one method step 66, a damaging/wear of the first transparent element 16 is detected. In at least one further method step 68, the damaged and/or aged first transparent element 16 is removed. Herein the mounting elements 54 are disassembled and the damaged/worn-down first transparent element 16 is taken out of the frame unit 20. In at least one further method step 70, a new transparent element, which is at least substantially identical to the first transparent element 16, is inserted into the frame unit 20. Herein the mounting elements 54 are re-mounted. The new transparent element replaces the worn-down/damaged first transparent element 16.

The invention claimed is:

1. A balancing machine protective cover for an at least temporary closing of a balancing chamber of a balancing machine, with at least one first transparent element, with at least one second transparent element and with a frame unit, wherein the transparent elements are shaped and/or arranged in such a way that they can delimit the balancing chamber to at least one side, and wherein the two transparent elements are held by the frame unit in such a way that they together form a double-walled delimitation of the balancing chamber to the at least one side.

2. The balancing machine protective cover according to claim 1, wherein the transparent elements are shaped and/or arranged in such a way that they can delimit the balancing chamber to at least one further side, which is arranged at least substantially perpendicular to the side, and wherein the two transparent elements are held by the frame unit in such a way that they together form a double-walled delimitation of the balancing chamber at least to the two different sides.

3. The balancing machine protective cover according to claim 2, wherein the transparent elements are shaped and/or arranged in such a way that they can delimit the balancing chamber to at least one second further side, which is arranged at least substantially perpendicular to the side and to the further side, and wherein the two transparent elements are held by the frame unit in such a way that they together form a double-walled delimitation of the balancing chamber at least to the three different sides.

4. The balancing machine protective cover according to claim 1, wherein the first transparent element is arranged so as to face towards the balancing chamber and is made of a material having a significantly higher break safety and/or shock strength than the second transparent element.

5. The balancing machine protective cover according to claim 1, wherein the first transparent element is arranged so as to face towards the balancing chamber and forms a sacrificial pane.

6. The balancing machine protective cover according to claim 5, wherein the sacrificial pane is mounted, in particular on the frame unit, in a non-destructively exchangeable manner.

7. The balancing machine protective cover according to claim 5, wherein the sacrificial pane is mounted on the frame unit via quick-exchangeable mounting elements.

8. The balancing machine protective cover according to claim 5, wherein the sacrificial pane is made of a polycarbonate.

9. The balancing machine protective cover according to claim 1, wherein the second transparent element is arranged so as to face an outer side and is made of an acrylic glass.

10. The balancing machine protective cover according to claim 1, wherein the first transparent element and/or the second transparent element substantially projects in at least one spatial direction beyond a space formed by a smallest possible imaginary geometric cuboid which just still completely encloses the frame unit.

11. The balancing machine protective cover according to claim 1, wherein the frame unit comprises at least one hinge.

12. The balancing machine protective cover according to claim 1, wherein, in particular viewed at least in a projection onto a horizontal plane, an imaginary plane intersecting with all vertical sides of the frame unit is substantially angled with respect to all pane planes formed by the transparent elements.

13. The balancing machine protective cover according to claim 1, wherein the frame unit is formed of sheet metal.

14. The balancing machine protective cover according to claim 1, wherein the first transparent element and/or the second transparent element are/is realized free of symmetry axes.

15. The balancing machine protective cover according to claim 1, wherein a spacing of pane planes of the first transparent element and of the second transparent element is at least 0.3 cm, preferably at least 0.5 cm and preferentially at least 1 cm.

16. The balancing machine protective cover according to claim 1, wherein at least the second transparent element forms a gripping recess.

17. A balancing machine with a balancing machine protective cover according to claim 1.

18. A method for refurbishing a balancing machine protective cover according to claim 1, wherein a damaged and/or aged transparent element that faces towards the balancing chamber is removed and is replaced by a new transparent element that is at least substantially identical.

* * * * *